April 19, 1966 C. O. GLASGOW 3,246,451
LIQUID DISTRIBUTION SYSTEM
Original Filed May 22, 1961 5 Sheets-Sheet 1

INVENTOR.
CLARENCE O. GLASGOW
BY
ATTORNEY

April 19, 1966    C. O. GLASGOW    3,246,451
LIQUID DISTRIBUTION SYSTEM
Original Filed May 22, 1961    5 Sheets-Sheet 2

INVENTOR.
CLARENCE O. GLASGOW
BY
ATTORNEY

INVENTOR.
CLARENCE O. GLASGOW
BY
ATTORNEY

April 19, 1966 C. O. GLASGOW 3,246,451
LIQUID DISTRIBUTION SYSTEM
Original Filed May 22, 1961 5 Sheets-Sheet 4

INVENTOR.
CLARENCE O. GLASGOW
BY
ATTORNEY

April 19, 1966 C. O. GLASGOW 3,246,451
LIQUID DISTRIBUTION SYSTEM
Original Filed May 22, 1961 5 Sheets-Sheet 5

INVENTOR.
CLARENCE O. GLASGOW
BY
ATTORNEY

# United States Patent Office 3,246,451
Patented Apr. 19, 1966

3,246,451
LIQUID DISTRIBUTION SYSTEM
Clarence O. Glasgow, Tulsa, Okla., assignor to National Tank Company, Tulsa, Okla., a corporation of Nevada
Continuation of application Ser. No. 111,647, May 22, 1961. This application Mar. 22, 1965, Ser. No. 444,925
9 Claims. (Cl. 55—45)

This application is a continuation of S.N. 111,647, filed May 22, 1961, and now abandoned.

The present invention relates to collecting fluids from several points and redistributing liquid phases of the fluids to other points. More specifically, the invention relates to collecting liquids into a single fluid stream and separating various phases of the fluid stream while forming predetermined proportionate shares of selected phases of the stream.

The present invention is generally applicable to the problem of collecting and redistributing the phases of any stream of fluid. However, one of most critical problems today is found in the gathering systems of oil fields. Certain fluids of oil field production, gathered into a single stream, must often be redistributed to a plurality of processing units, any one of which units does not have sufficient capacity to handle the total amount of fluids to be processed. Conservation regulations of an oil producing locality may limit the rate of produciton of individual wells. Under such circumstances, it is economically desirable to centralize the production of a number of these wells for processing of their fluids. A degree of separation may be desired between the phases of the fluids collected. Then it may become evident that a number of fluid processing heat treaters are required to treat the oil and/or emulsion phases of liquid. The treaters then become the points for predetermined proportionate shares of these phases of the fluids.

There are localities where production from wells of high capacity is not limited by local regulations. A quantity of fluid production from one such well may exceed the capacity of individual treaters available. Whether the large quantity of fluids is a result of collecting from a number of small wells or one large well, there exists the problem of distributing selected phases of the total fluids, in predetermined proportionate shares, to a number of treaters. Control of this distribution of production fluids to each treater must be maintained over a range of variation in the quantity of fluids produced in a manner that will avoid overloading one or more of the treaters while underloading the remaining treaters.

A principal object of the invention is to continuously separate one phase of multiple-phase fluids while dividing selected liquid phases into predetermined proportionate shares.

Another object is to provide sufficient capacity for passing the gaseous phase through a system for splitting selected liquid phases of a high gas-liquid ratio fluid stream into predetermined proportionate shares.

Another object is to separate a liquid phase from a multiple-phase collection of fluids while conducting predetermined proportionate shares of selected liquid phases from the collection and energize the conducted removal with the pressure of the gaseous phase of the collection.

Another object is to provide readily accessible manual adjustment for the height of weirs over which the predetermined proportionate shares of the selected liquid phases pass.

The present invention contemplates provision of a single vessel in elongated form horizontally extended into which a multiple-phase stream of fluid is conducted. The internal structure of the vessel separates and removes one of the liquid phases from the stream and distributes certain other liquid phases of the stream to a number of points in predetermined proportionate shares.

The invention contemplates employing the vessel of horizontal-elongated form in order to provide the capacity needed to handle the gaseous phase of streams having high gas-liquid ratio. This horizontal form facilitates accommodation of the gaseous phase of streams of high gas-fluid ratio, with fabrication costs generally lower than vessels designed for vertical extension.

The invention contemplates the horizontal-elongated vessel separating one liquid phase from the stream, passing the liquid phase of streams with high gas-liquid ratio and energizing the discharge of both liquid phases while one phase is divided in predetermined proportionate shares.

Finally, the invention contemplates structure extending from internal the vessel to external the vessel providing manual adjustment of weir heights, the weirs controlling the division of the liquid phases into the predetermined proportionate shares.

Other objects, advantages and features of this invention will become apparent to one skilled in the art upon consideration of the written specification, appended claims, and attached drawings wherein;

Figure 1:
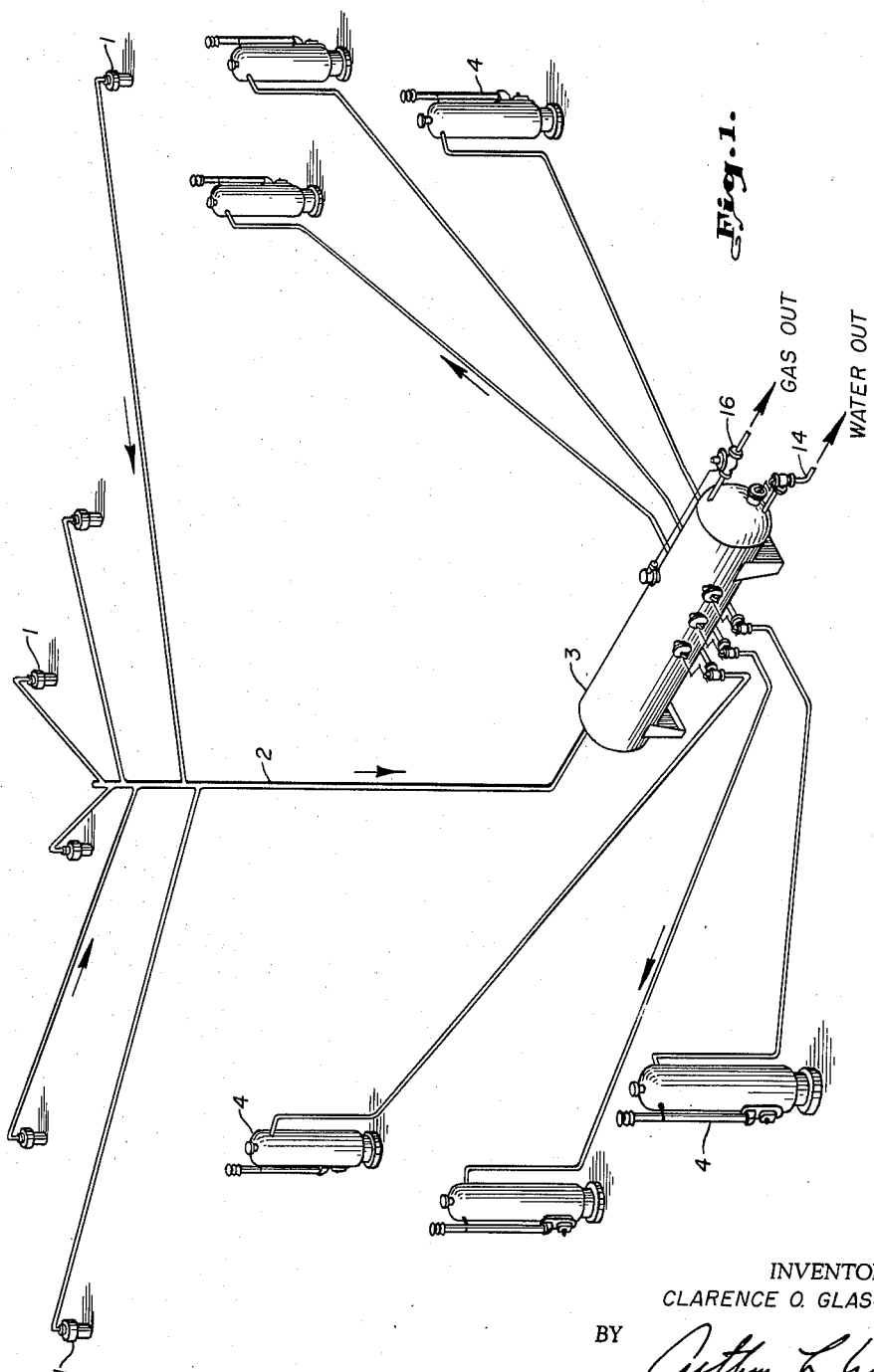
FIG. 1 is a diagrammatic representation of several sources of oil well production, the total production being distributed to a number of treaters by apparatus in which the present invention is embodied.

FIG. 1 illustrates an overall environment for the present invention. The well-heads of several oil wells 1 are indicated, producing liquids and gas which are fluids requiring field processing prior to their delivery to pipe lines of purchase. These wells merely represent one type of source for fluids to be divided. The various wells 1 are connected to a manifold conduit 2 in order that their combined fluid production may be transported to a unitary vessel 3 for separation and distribution of oil and/or emulsion to field processing equipment.

The vessel 3 has an internal arrangement with which to separate a phase of the liquids of the production as free water. The system is conceived as particularly suitable for separating and splitting production with a high gas-liquid ratio. The gaseous phase is separated from the liquids in this vessel 3. Treaters 4 then receive those liquids which have been separated from the free water phase. The treaters 4 break whatever emulsion exists in the production fluids split into them, separating these fluids into merchantable oil and water.

The system contemplates it to not be practical to use a single treater to handle the total amount of production fluids of manifold conduit 2 which require field processing. The basic problem is met by the invention dividing the liquids to be processed into predetermined portions, each portion processed by one of the treaters 4.

The present invention functions whether the produced fluids flow from a single well of large capacity of comprises the total production of a number of wells, each well having limited production. In either event, the present invention provides for dividing the processing function among a number of precessing units in order that a limited group of the units will not be overburdened while the remainder of the units are underburdened in their processing function.

SPLITTER VESSEL 3

Figure 2:
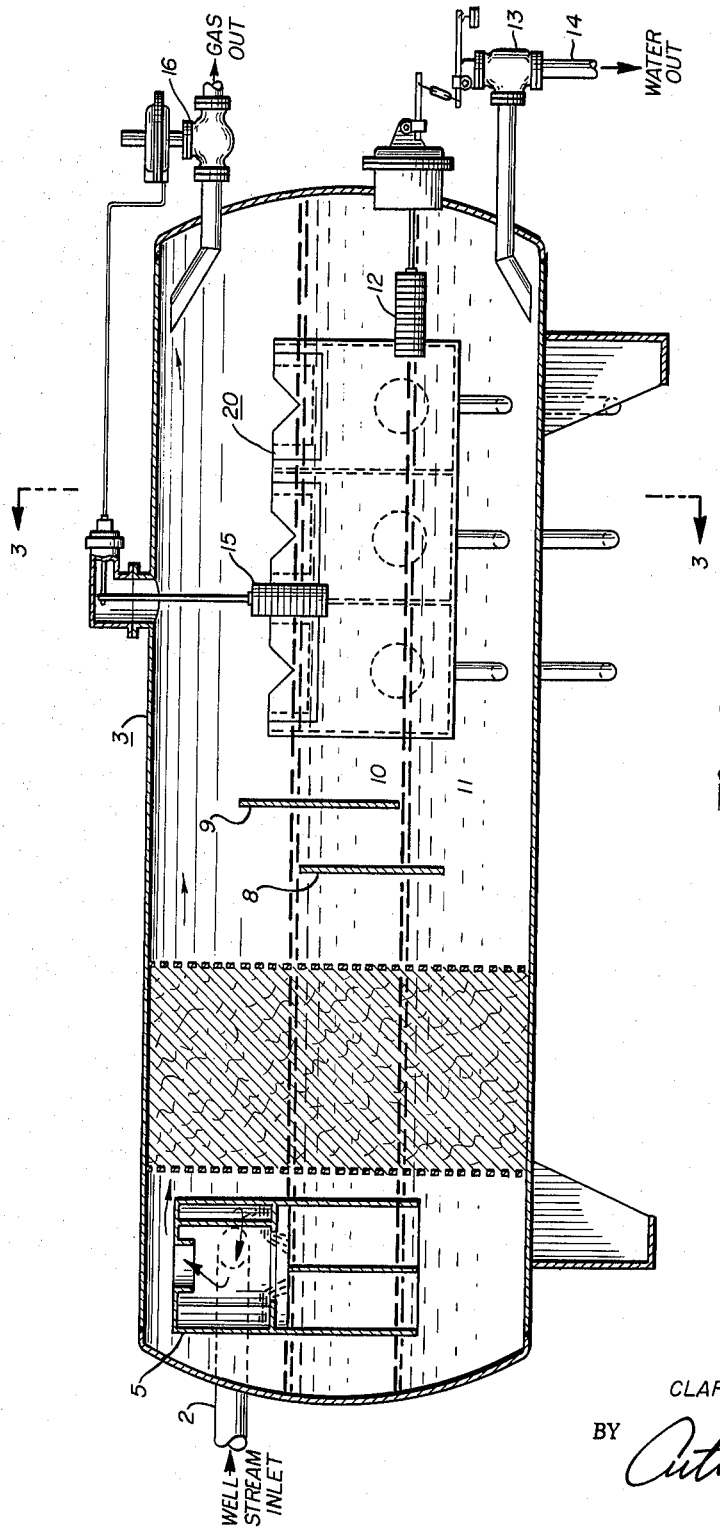
FIG. 2 is a sectioned side elevation of the vessel of FIG. 1 with internal structure embodying the present invention for making the separation and splitting of multiple-phase fluids.
Figure 3:
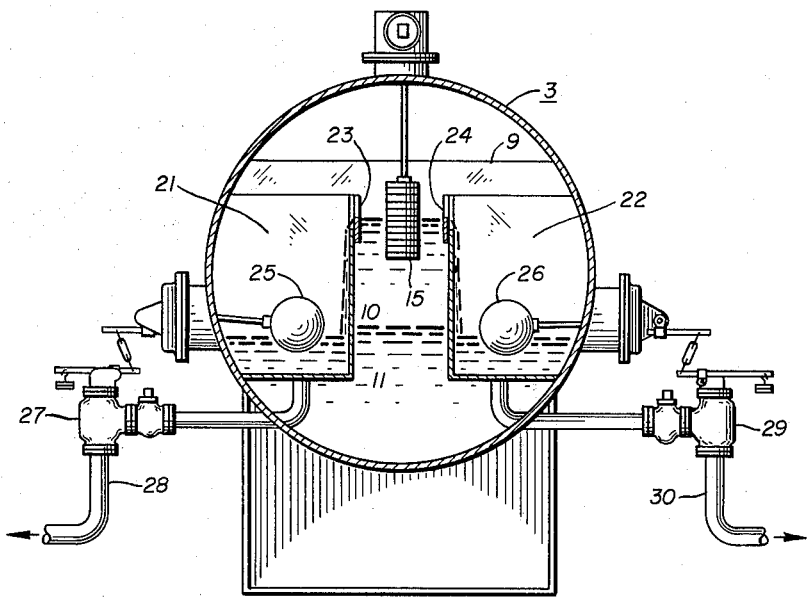
FIG. 3 is a sectioned end elevation of the vessel of FIG. 2 along the lines 3—3.

FIGS. 2 and 3 are to be considered together as illustrating the internal structure of vessel 3 into which the total production is brought. Within this unitary vessel, the multiple-phase production of manifold conduit 2 is separated into its gaseous and liquid phases. The multiple liquid phases are further divided into a free water portion and a portion consisting of an oil and/or emulsion phase. The free water phase is separated and continuously removed while the oil and/or emulsion is divided, or split, and distributed among treaters 4.

The specific form given the vessel 3 is that of a cylindrical shell, its longitudinal axis horizontally extended. The fluids of manifold 2 are brought into one end of this horizontal vessel with an internal structure which causes it to simultaneously function as a gas-liquid separator and splitter of selected phases of the liquids into predetermined proportionate shares.

In general, the gas separated from the liquids of the production stream are released from the top of shell 3. The gas released is placed under the control index of the level of the liquid phases in the lower portion of the shell.

The horizontal arrangement of the vessel and introduction of the liquids from one of its ends provides the horizontal travel and residence time to enable the liquids to separate into layers, or strata, the oil and/or emulsion forming a lighter layer on top of the free water layer. A level detector is provided to sense the interface between the two layers and to control the withdrawal of the free water from the lower layer. The lighter oil and/or emulsion then passes over a series of weirs which meters the liquids into separate compartments within the vessel. Each predetermined proportionate share of oil and/or emulsion passed over the weirs is then drawn from the separate compartments to treaters 4.

The separation in vessel 3

FIG. 2 is specifically provided to illustrate manifold conduit 2 introducing the multiple-phase fluids into the shell 3 end of the shell 3 as viewed in FIG. 2. Structure is provided at the entrance to impart a vortex motion to the stream.

Cylindrical drum 5 receives the well stream in its upper portion, tangential to the internal wall of the drum. The liquids spread upon the wall. Free gas is released and flows upwardly, to the top of the shell 3. The liquids fall downwardly through a central opening in a plate transverse the cylindrical drum. Below the plate opening the transverse plate are mounted two vertical plates at right angles, to each other. These plates catch the spinning liquids, stop their spin and deliver the liquids below the level of the liquids in the bottom of the shell 3.

From the drum 5, the liquids start an elongated travel down the length of the vessel. The elongated travel is of such length, and the vessel is of such diameter, that a residence time is thereby provided which enables the force of gravity act on the liquids and form the lower heavier free water layer of the water phase of the liquids. Of course, the lighter oil and/or emulsion forms on top of the water layer.

Various internal structure may be provided in shell 3 to aid the separation of the liquid phases. A hay section 6 is indicated, between vertical, foraminous baffles. Hay section 6 is merely representative of several forms of internal structure which can be provided to aid coalescence of the various liquid phases of the fluids of conduit 2.

Additional baffles 8 and 9 present barriers to the horizontal flow of the multiple-phase liquids down the length of the shell 3. Vertical baffle 8 is extended transverse shell 3. Baffle 8 is extended vertically downwardly from a point below the surface of the oil and/or emulsion layer to a point well below the interface of the liquid layers. This barrier then provides a path for the oil and/or emulsion over the baffle 8 while coalescing water is caused to flow downwardly to join the water of the lower layer.

Vertical baffle 9 is parallel to baffle 8 and extends downward from a point well above the surface of the oil and/or emulsion to a point well above the interface. In this arrangement, foam on top of the liquids is retarded, giving it time to dissipate. The oil and/or emulsion is forced to flow under this baffle 9, therefore, the upper layer of liquids reaching the right end of shell 3 are in a relatively quiescent state, prepared for the splitting operation which will divide them into predetermined proportionate shares for distribution to treaters 4.

The layer 10 of liquid oil and/or emulsion is split into shares by a weir system. Layer 11 is made up of the free water beneath layer 10. A float 12 is located at the interface between layers 10 and 11. Float 12 follows the vertical height of the interface and is mechanically linked with water discharge valve 13 in conduit 14 for direct control of discharge of fuel water from layer 11 to maintain the vertical position of the interface.

The common height of the lighter liquid phases flowing over the weirs is detected by a float 15. Float 15 may be linked to control mechanism in any well-known way to establish a fluid pressure output. This output is applied to the control of gas discharge valve 16. Gas discharge from the upper position of shell 3 controlled by valve 16 regulates the pressure maintained on the surface of the liquid phases in shell 3. This pressure is effective in energizing the discharge of liquids from both the free water conduit 14 and the conduits removing the predetermined proportionate shares of the oil and/or emulsion from shell 3. While also effective to retard the flow into the vessel through inlet 2. The energized removal is primarily intended to keep the liquid level under control, and within a predetermined range of heights, as detected by float 15 and secondarily intended to energize the removal of the shares to treaters 4.

Splitting, or dividing, in vessel 3

Important as the separating function of vessel 3 is, the function of the vessel in forming proportionate shares of the oil and/or emulsion phases is also very important. After all, this splitting function is the end result sought by the vessel 3 and its internal structure. Section 20 is mounted in the right end of shell 3 as the weir structure to perform this function in combination with the separating function.

The configuration of section 20 is more fully appreciated by simultaneous consideration of FIGS. 2 and 3. A section has been taken through FIG. 2 to form FIG. 3. This view shows its location of float 15 as it detects the level of all liquid layers. Further, it illustrates the function of the weirs whose vertical positions establish the predetermined proportionate shares of the lighter liquids of layer 10.

The section 20 comprises a multiplicity of compartments within shell 3. FIG. 2 specifically indicates there are six such compartments in this particular embodiment. However, it is obvious that the invention is not limited to a specific number of compartments. The number of compartments provided will be established by the number of shares into which it is desired to split the liquids of layer 10.

The section taken through shell 3 to form FIG. 3, illustrates a pair of compartments 21 and 22 of section 20. The other four compartments are similar to compartments 21 and 22. Each of compartments 21 and 22 has its own weir. The weirs are simple V-notch plates, placed within an adjusted, predetermined range of height. Weir plate 23 and weir plate 24 provide the metering, weir notch over which the liquids of layer 10 flow into the bottom of compartments 21 and 22.

Each weir determines the predetermined proportionate share of the liquids of layer 10 allowed to flow into its particular compartment. Usually, it will be desirable to make an even distribution of the liquids among all compartments. However, it may well be desired that the predetermined proportionate share of a specific compartment be more or less than other compartments. The processing equipment supplied may have widely varying operating capacities or conditions of operation.

In any event, the liquids flowing into a specific compartment have a level within the compartment which is detected by a float. Compartment 21 is shown with a float 25, and compartment 22 with a float 26. These floats are each mechanically linked to a valve in the discharge conduit from their respective compartments. Float 25 controls valve 27 which is in discharge conduit 28 from compartment 21. Float 26 is mechanically linked to discharge valve 29 which is in discharge conduit 30. Each float-valve combination then regulates the flow of liquids from each compartment to maintain a predetermined level in the compartment.

OPERATION

It is anticipated that the elongated, horizontal form of shell 3 will receive fluid streams from conduit 2, having a high gas-liquid ratio. In this horizontal form, shell 3 provides a high capacity with respect to through-put of separated gas. The gas capacity of this particular form of horizontal vessel is quite large when compared to that of a vertical form of vessel having comparable size. The ultimate result is that the horizontal vessel can be sized to a particular capacity more economically than a vertical form of vessel to provide the same through-put of gas.

Additionally, the elongated form for shell 3 provides a tremendous advantage in giving time for the liquids of the produced stream from conduit 2 to stratify into their respective layers. This particular form of horizontal vessel is quite valuable in its separation ability while simultaneously providing means for making a predetermined proportionate splitting, or dividing, of a selected liquid phase of the produced stream. The heavier liquid phase is regulated to the lower portion of shell 3 and discharged to maintain a predetermined level while the lighter, upper phases of oil and/or emulsion are split, divided into predetermined proportionate shares. Finally, the discharge of all liquids, from both free water discharge conduit 14 and the respective compartment discharges, is energized by the pressure of gas developed on the surface of the liquid phases by the adjustment of gas discharge valve 16 under the direction of float 15.

FIG. 4 VERSION OF SEPARATOR-SPLITTER

Figure 4:
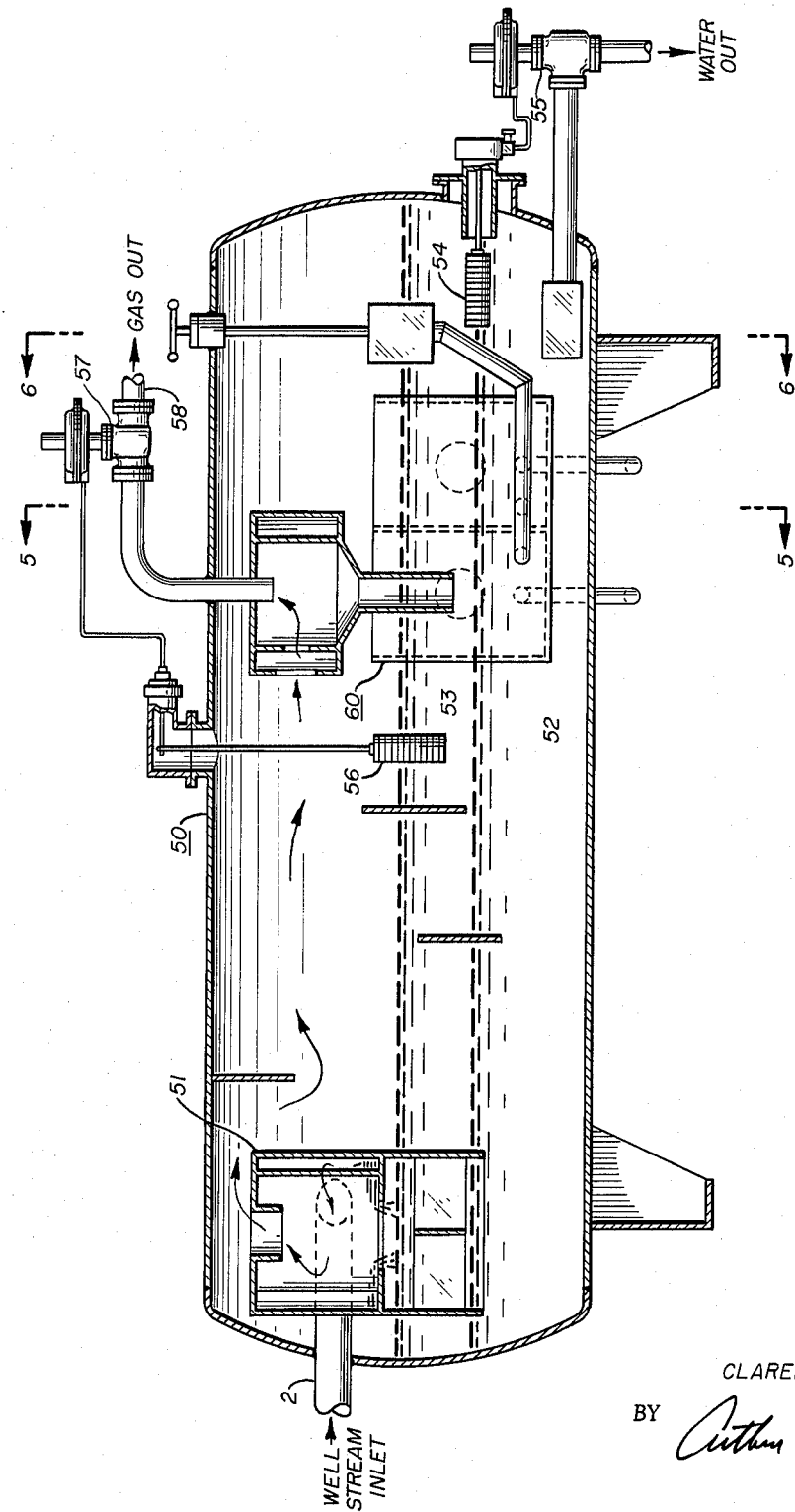
FIG. 4 is a sectioned side elevation of another form for the vessel of FIG. 2 with internal structure for performing the separation and splitting function of the present invention.

FIG. 4 illustrates another form for a horizontally extended shell in which the present invention is embodied. Shell 50 is illustrated as receiving the fluids from conduit 2 in much the same manner as shell 3 received the fluids. A vortex is developed for the fluids within cylindrical shell 51. Free gas is released from the liquids and the liquids fall to the bottom of the horizontal shell 50. Their elongated travel, with residence time, develops the formation of water layer 52 and emulsion and/or oil layer 53.

Interface float 54 functions to detect the bottom of layer 53 and the top of layer 52 and to control discharge valve 55 in passing water from layer 52 to maintain the interface at a predetermined height in shell 50. Float 56 is provided to detect the top of layer 53 and to control valve 57 in discharging gas from the upper portion of shell 50 through conduit 58. The principal difference between the internal structure of shell 50 and the internal structure of shell 3 is found in the construction of compartment section 60 as compared with compartment section 20.

Figure 5:
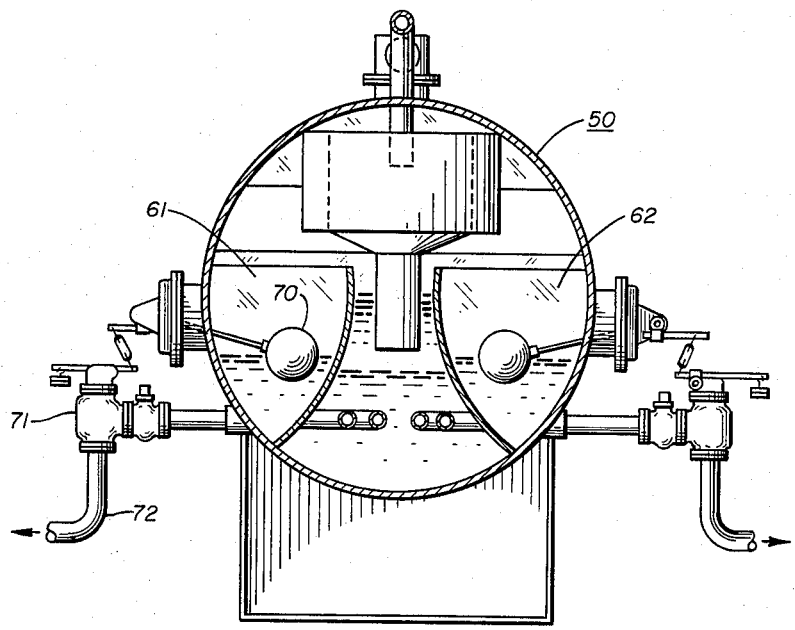
FIG. 5 is a sectioned end elevation of the vessel of FIG. 4 along the lines 5—5.
Figure 6:
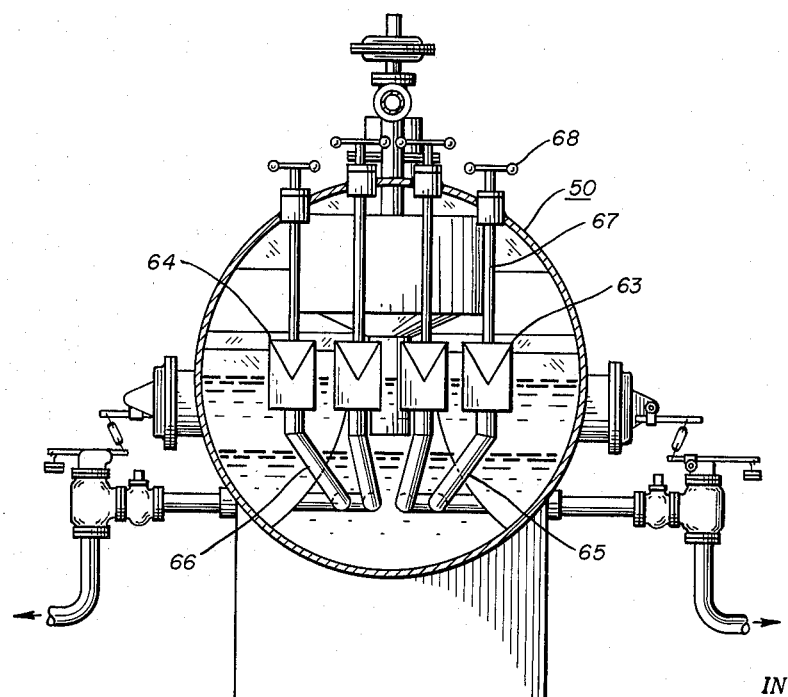
FIG. 6 is a sectioned end elevation of the vessel of FIG. 4 along the lines 6—6.

FIGS. 5 and 6 must be considered together, with FIG. 4, to thoroughly appreciate the arrangement of separate compartments within structure 60. In FIG. 5, compartment 61 and compartment 62 are illustrated as providing depositories for predetermined proportionate shares of the liquids of layer 53. However, the weir structures over which these liquids flow into compartments 61 and 62 are not mounted fixedly on the walls of the compartments. Rather, a separate weir box is provided for each compartment and connected by flexible conduit to the compartment.

FIG. 6 shows four weir boxes, mounted in shell 50, so they may be adjusted vertically within a predetermined range of heights to flow liquids from layer 53 into their respective compartments. Weir box 63 is provided for compartment 62, and weir box 64 is provided for compartment 61. Weir box 63 has a weir-notch over which the liquids of layer 53 flows and a flexible conduit 65 for conducting such liquids into compartment 62. Weir box 64 has a similar flexible conduit 66 for the conduct of liquids into compartment 61.

The weir boxes are illustrated in close proximity to each other and with uniform gradient of liquid level from the liquids of layer 53 to their respective weir notches. Therefore, if the weir boxes are maintained so their respective weir notches are level, the liquids of layer 53 will flow in equal shares into their respective compartments. However, provision is made for manual adjustment, external of shell 50, of the height of the weir boxes.

Each of the weir boxes is provided with a rod-stem extending vertically upward through the wall of shell 50. Weir box 63 has rod-stem 67 as an illustration of this support structure. Rod-stem 67 is vertically adjustable by manual manipulation of hand-wheel 68. With each weir box provided similar structure for manual adjustment of their respective heights, it is obvious that the predetermined proportionate shares of liquid removed from layer 53 by the various weir notches is arbitrarily selected by an operator without the necessity of opening up shell 50.

Whether the compartments receive equal shares of the liquids of layer 53 or some predetermined proportion thereof, the liquids collected in the respective compartments are valved therefrom through discharge conduits. In representation of this arrangement, compartment 61 is illustrated in FIG. 5 as having float 70 detecting the level of liquids conducted thereto through flexible conduit 66. Float 70 mechanically manipulates discharge valve 71 to discharge its liquids through conduit 72.

The other compartments are valved in a similar manner so that their respective liquids will be removed to treaters 4.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. A method of distributing the fluid mixture of oil well production containing gas to processing units, including, flowing the fluid mixture into a compartment of an elongated horizontal vessel which compartment provides the residence time for the gas of the mixture to form a stratum above the liquid phase, controlling the discharge of gas from the stratum above the liquid phase from the vessel to a point of use to maintain the height of the liquid phase in the vessel within a predetermined range of heights, dividing the liquid phase in the vessel compartment within the predetermined range of heights into a predetermined number of portions of predetermined relative size within the vessel,
collecting each of the divided portions of the liquid phase in a separate compartment within the vessel,
applying the gas pressure above the undivided liquid phase within the vessel equally to the surfaces of the divided portions of liquid in each of their separate compartments,
discharging liquid from each of the divided portions of liquid in each vessel compartment to a liquid processing unit for the liquid with the force of the gas pressure while simultaneously applying the force of gas pressure to retard the flow of the oil well mixture into the vessel,
and maintaining the level of the liquid in each separate vessel compartment high enough to prevent discharge of gas from the vessel with the liquid discharged to the liquid processing unit.

2. A system for distributing the fluid mixture of oil well production containing gas to processing units, including,
an elongated vessel extending in a horizontal direction,
an inlet conduit connected to the elongated horizontal vessel with which to flow the fluid mixture from an oil well into a compartment within the vessel which compartment provides the residence time for the gas of the mixture to form a stratum above the liquid phase,
a first level control mounted in the vessel at a position to sense the height of the top of the stratum of the liquid phase,
a gas outlet conduit connected to the vessel through which gas is discharged from the stratum above the liquid phase and connected to the first level control to be controlled in varying the flow of gas through the conduit to maintain the height of the top of the stratum of the liquid phase within a predetermined range of heights,
a plurality of weirs positioned within the vessel at the predetermined range of liquid heights adjacent the vessel compartment providing the residence time to receive liquid flowing from the stratum of liquid phase to divide the liquid into a predetermined number of portions of predetermined relative size,
a separate compartment for each portion of the liquids divided by each weir, each separate compartment being positioned beneath one of the weirs and communicated with the gas stratum in the compartment providing the residence time for applying the pressure of the gas to the surface of each liquid portion while the pressure of the gas is simultaneously applied to retard the flow of the oil well mixture into the vessel,
an outlet conduit connected to each separate compartment and a one of the number of liquid processing units for conducting liquid from the portion in the separate compartment to the processing unit,
and a second level control mounted at a position in each separate compartment to sense the level of liquid in the compartment and restrict the outlet conduit of that compartment to maintain the level of the liquids of the portion high enough to prevent discharge of gas from the vessel through the outlet conduit.

3. The system of claim 2 including,
means manually operable from external the vessel to change the relative size of the liquid portion divided by each of the plurality of weirs dividing the portion from the liquid phase.

4. A method of distributing the fluid mixture of oil well production to processing units, including,
flowing the fluid mixture into a compartment of an elongated horizontal vessel which compartment provides the residence time for the lighter liquid phases of the mixture to form a stratum above the remaining liquid phases of the mixture and gas of the mixture to form a stratum above the liquid phases,
controlling the discharge of gas from the stratum above the liquid phases from the vessel to a point of use to maintain the height of the stratum of lighter liquid phases in the vessel within a predetermined range of heights,
dividing the lighter phases of the mixture of liquids in the vessel compartment within the predetermined range of heights into a predetermined number of portions of predetermined relative size within the vessel,
collecting each of the divided portions of the lighter phases of the liquids in a separate compartment within the vessel,
applying the gas pressure above the undivided liquid phases within the vessel equally to the surfaces of the divided portions of liquid in each of their separate compartments,
discharging liquid from each of the divided portions of liquid in each vessel compartment to a liquid processing unit for the liquid with the force of the gas pressure while simultaneously applying the force of gas pressure to retard the flow of the oil well mixture into the vessel,
and maintaining the level of the liquid in each separate vessel compartment high enough to prevent discharge of gas from the vessel with the liquid discharged to the liquid processing unit.

5. A system for distributing the fluid mixture of oil well production to processing units, including,
an elongated vessel extended in a horizontal direction,
an inlet conduit connected to the elongated horizontal vessel with which to flow the fluid mixture from an oil well into a compartment within the vessel which compartment provides the residence time for the lighter liquid phases of the mixture to form a stratum above the remaining liquid phases and gas of the mixture to form a stratum above all liquid phases,
a first level control mounted in the vessel at a position to sense the height of the top of the stratum of the lighter liquid phases,
a gas outlet conduit connected to the vessel through which gas is discharged from the stratum above the liquid phases and connected to the first level control to be controlled in varying the flow of gas through the conduit to maintain the height of the top of the stratum of the lighter liquid phases within a predetermined range of heights,
a plurality of weirs positioned within the vessel at the predetermined range of light liquid heights adjacent the vessel compartment providing the residence time to receive liquid flowing from the stratum of lighter liquid phases to divide the liquid into a predetermined number of portions of predetermined relative size,
a separate compartment for each portion of the liquids divided by each weir, each separate compartment being positioned beneath one of the weirs and communicated with the gas stratum in the compartment providing the residence time for applying the pressure of the gas to the surface of each liquid portion while the pressure of the gas is simultaneously applied to retard the flow of the oil well mixture into the vessel,
an outlet conduit connected to each separate compartment and a one of the number of liquid processing units for conducting liquid from the portion in the separate compartment to the processing unit,
a second level control mounted at a position in each separate compartment to sense the level of liquid in the compartment and restrict the outlet conduit of that compartment to maintain the level of the liquids of the portion high enough to prevent discharge of gas from the vessel through the outlet conduit, and means to remove the remaining liquid phases from the vessel.

6. The method of claim 4 including,
discharging liquid from the stratum of liquid phases below the stratum of lighter liquid phases to maintain a predetermined height for the top of the stratum below the stratum of lighter liquid phases.

7. The system of claim 5 including,
an outlet conduit connected to the vessel with which to flow liquid from the liquid phases below the lighter liquid phases,
a third level control mounted in the vessel at a position to sense the height of the top of the liquid phases below the lighter liquid phases and connected to the outlet conduit to flow liquid from the vessel at a rate which will maintain a predetermined height for the top of the liquid phases from which the liquid is flowed.

8. The system of claim 5 including,
means manually operable from external the vessel to change the relative size of the liquid portion divided by each of the plurality of weirs dividing the portion from the stratum of lighter liquid phases.

9. The system of claim 7 in which the three level controls each comprise a float carried by the liquid levels sensed and an operative connection from the float to a valve in the respective outlet conduit to adjust the valve opening in determining the fluid flow rate through the respective outlet conduit.

References Cited by the Examiner
UNITED STATES PATENTS

| | | | |
|---|---|---|---|
| 828,515 | 8/1906 | Schmidt | 210—519 |
| 1,105,242 | 7/1914 | Bilyeu | 317—262 |
| 1,797,697 | 3/1931 | Rymel | 210—539 |
| 1,839,430 | 1/1932 | Weber | 137—262 |
| 2,167,160 | 7/1939 | Raymond | 210—180 |
| 2,284,737 | 6/1942 | Hirshstein | 210—538 |
| 2,664,963 | 1/1954 | Lovelady et al. | 55—174 |
| 2,728,406 | 12/1955 | Maher | 55—174 X |
| 2,738,026 | 3/1956 | Glasgow et al. | 55—174 X |
| 2,825,422 | 3/1958 | Schoenfeld | 210—537 X |
| 2,826,306 | 3/1958 | Burns | 210—539 X |
| 2,857,055 | 10/1958 | Glasgow | 55—169 |
| 2,869,675 | 1/1959 | Coggins | 55—174 X |
| 2,984,360 | 5/1961 | Smith | 210—537 |

REUBEN FRIEDMAN, *Primary Examiner.*